July 1, 1924.
F. W. ERICKSON
1,499,813
METHOD AND MACHINE FOR SAWING METAL ARTICLES
Filed Aug. 18, 1921
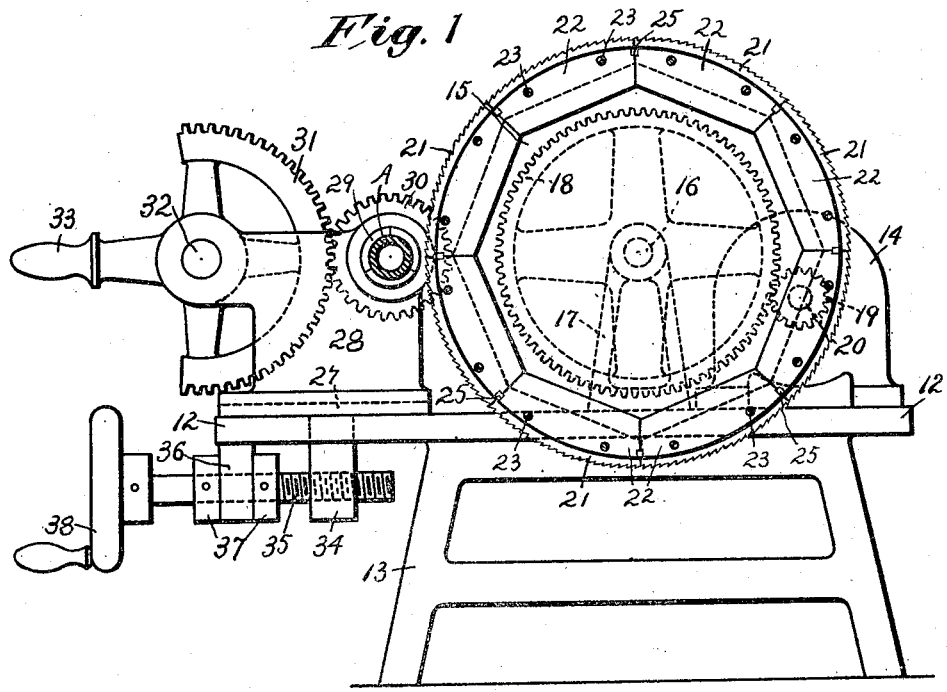
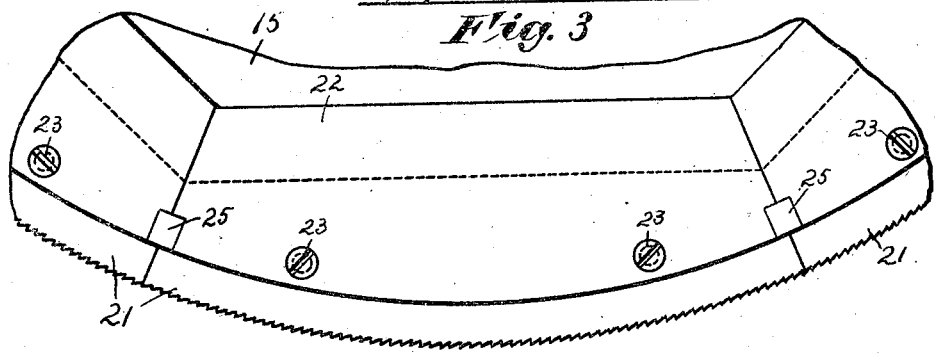
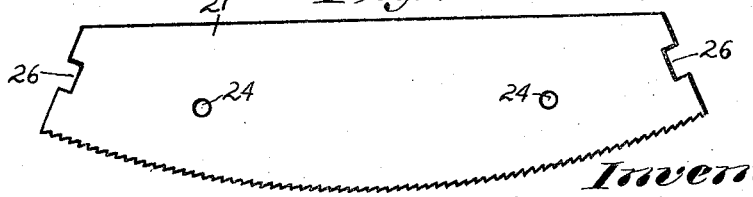
Inventor
Frederic W. Erickson
by J. W. Harrison
Attorney Patented July 1, 1924.

1,499,813

UNITED STATES PATENT OFFICE.

FREDERIC W. ERICKSON, OF PELHAM MANOR, NEW YORK.

METHOD AND MACHINE FOR SAWING METAL ARTICLES.

Application filed August 18, 1921. Serial No. 493,305.

*To all whom it may concern:*

Be it known that I, FREDERIC W. ERICKSON, a citizen of the United States, and resident of Pelham Manor, in the county of Westchester and State of New York, have invented certain new and useful Improvements in Methods and Machines for Sawing Metal Articles, of which the following is a specification.

This invention relates to metal cutting machinery and has particular reference to the sawing of pipes or conduits, especially such as are used in the installation of electric wiring. The invention relates to both the method of sawing such articles and to machines or appliances for carrying out the method. I do not, however, limit myself to the use of the machine or appliance itself for any specific purpose.

Heretofore iron pipes have been cut either by a hack saw, a wheel hand cutter, or by rotating the pipe in a lathe and using a cutting-off tool. The latter is a cumbersome and slow method. A wheel cutter leaves the pipe deformed, and with its exterior diameter enlarged and its interior diameter decreased, so that it is not suited for use where the pipes are to be joined without restriction at the joints. And pipes so cut are not suitable for use in installing a conduit for electric wiring because, for such purpose, the joined pipes must have a smooth and continuous passageway for the proper drawing in of the wires. Therefore the most commonly practiced method is to employ a hand-operated hack saw. The well-known power-operated hack saws leave a burr on the inside of the pipe for a portion thereof and a burr on the outside opposite the inside burr. While satisfactory work can be produced by a hand-operated hack saw, rotating the pipe while doing so, it is a slow method because the sawing is necessarily intermittent, and an expensive method on account of the high cost of labor.

One of the objects of my invention is to increase the output of sawed pipe sections by subjecting the work to a continuous sawing operation and rotating the work during said sawing operation.

Another object is to provide a machine or appliance by means of which the above stated object can be attained with little or no expert manual labor.

With the above and certain other objects the advantages of which will be explained hereinafter, my invention consists in the method and the appliance substantially as hereinafter described and claimed.

Of the accompanying drawings which illustrate the machine or appliance in one of its embodiments:—

Figure 1 is a side elevation of the complete machine.

Figure 2 is a side elevation of one of the saw blades.

Figure 3 is a view similar to a portion of Figure 1 on a larger scale.

Similar reference numerals indicate similar parts in all of the views.

A suitable support for the machine may comprise a bench or table 12 mounted on legs 13, and supporting a motor 14 such as an electric motor. A disk or wheel 15 is mounted to rotate on or with a shaft 16 which is mounted in bearings provided in a bracket 17 rising from the table 12. Secured to one side or face of the wheel 15 is a spur gear 18 meshing with a pinion 19 carried by the shaft 20 of the motor 14 whereby the wheel is continuously rotated. Secured to the peripheral portion of the other side or face of the wheel 15 are segmental saws 21. The saw blades 21 are so shaped and proportioned relatively to the wheel 15 as to meet end to end and to project far enough outside of the periphery of the wheel to effect the sawing operation hereinafter described. They are uniform so as to be easily replaceable from stock, and are of such length that a predetermined number of them will present a complete circle when secured to the wheel. Figure 1 illustrates eight of the blades, but the number may be greater or less provided they present a complete circle of sawing teeth. A convenient way of securing the segmental saw blades to the wheel 15 in proper relative positions is illustrated in the drawings although I do not limit myself to the specific devices shown. The means illustrated comprise segmental clamping plates 22 preferably shaped similarly to the saw blades but wider, their outer edges being substantially flush with the periphery of the wheel 15. Screws 23 pass through holes in the clamping plates and in the wheel and through holes 24 (Fig. 2) in the saw blades. Rectangular studs 25 projecting from the wheel fit notches 26 (Fig. 2) in the ends of the saw blades and similar notches in the ends of the clamping plates.

I will now describe the means for holding the pipe or similar piece of work and feeding it toward the wheel and its saw blades during the continuous rotation of the latter.

Mounted in suitable guides or ways 27 on the table 12 is a carriage 28 having an expansible chuck 29 for clamping the work within it, said work being indicated sectionally in Figure 1 as a pipe A. A pinion 30 of the chuck is engaged by a toothed sector 31 carried by a shaft 32 having a lever or handle 33, said shaft being mounted in the carriage 28. A lug 34 of the carriage extends down through a suitable slot in the table and has a threaded hole (like a nut) engaged by a screw shaft 35 which is mounted to rotate in a fixed lug 36 depending from the table, collars 37 being secured to the screw shaft to prevent longitudinal movement of said shaft. The outer end of the screw shaft has a hand wheel 38.

The disk or wheel 15 may be of any desired thickness since no part of it ever acts on the work. In practice it is thick enough to firmly carry the segmental saw blades in absolute alinement during the sawing operation. Since the blades are clamped between one side face of the wheel and the plates 22 said blades can be made extermely thin which is desirable in saws for cutting metal. Each blade is laterally braced without being under any tension and liability of breakage is therefore reduced to the minimum.

In operation, the work such as a pipe A being clamped in the chuck and the wheel with its saw blades being continuously rotated, the operator gradually feeds the work toward the wheel and rotates said work. This is effected by one hand operating the hand wheel 38 and the other hand operating the handle or lever 33. The chuck pinion 29 and the toothed sector 31 are of such relative proportions, preferably, that the movement of the lever 33 in one direction will impart a complete rotation to the chuck and the pipe carried thereby. By simultaneously effecting the approach of the work toward the wheel and the rotation of the work, the pipe is quickly cut through by a continuous operation without leaving any such burrs as to interfere with the making of joints when installing a conduit system. On the other hand, the work can first be advanced without rotating it, until the wall of the pipe is cut through, and then by rotating the work the cut can be made entirely around.

This also results in leaving no objectionable burrs to interfere either with the making of joints betwen pipe sections or with the threading of wires through a conduit composed of a series of joined pipe sections. Whether rotation of the pipe begins as soon as it is moved into contact with the saw teeth, or not until the wall of the pipe is cut through as just described, the completion of the cut once around terminates the sawing operation. In either case no objectionable inside burrs are formed by the saw teeth because their cutting action is at no time in a direction toward the axis of the pipe. Said teeth complete their cutting action when they intersect the inner surface of the wall of the pipe, moving in a direction somewhat approximating a chord of the circular inner surface. In other words, the saw teeth never do any cutting action while moving directly in toward the center of the pipe, but only while there is still some metal behind, or partially behind, that which is being cut out, so as to offer a support against the formation of inside burrs.

In the embodiment of the invention illustrated, the saw blades 21 project beyond the edge of the wheel 15 a distance only slightly exceeding the thickness of the wall of the pipe. Therefore the edge of said wheel positively limits movement of the carriage 28 toward the saw teeth, by contact of the pipe with the edge of the wheel when the wall of the pipe is cut through, thereby preventing accidental advance of the pipe toward the wheel far enough to result in the formation of interior burrs in the pipe.

Having now described my invention, I claim:

1. The method of cutting metal pipes, consisting in subjecting the pipe to a continuous sawing operation and manually rotating the pipe during said operation, the final cutting operation being effected in a direction approximating a chord of the inner surface of the pipe.

2. The method of cutting metal pipes, consisting in simultaneously and continuously sawing and manually rotating the work, the final cutting operation being effected in a direction approximating a chord of the inner surface of the pipe.

3. A metal pipe cutting machine having means for sawing the pipe and having means for manually rotating the pipe and advancing it toward the sawing means, means being provided to prevent advance of the pipe beyond a point when the wall of the pipe is cut through.

4. A metal cutting machine having a rotary carrier, a series of thin saw blades of uniform thickness fixed thereto and having curved operating edges, segmental clamping plates for holding said blades against the side of the carrier, and means for holding a piece of work for the operation of said blades.

5. A metal cutting machine having a rotary carrier, means for continuously rotating said carrier, a series of thin saw blades of uniform thickness fixed to the carrier and having curved operating edges, a movable rotatable work holder adjacent said carrier, and means for independently operating said work holder.

6. A metal cutting machine having a rotary disk, means for continuously rotating said disk a series of thin segmental saw blades of uniform thickness affixed to one face of the disk in alinement, and independently movable means for holding a piece of work for the operation of said blades.

7. A metal cutting machine having a rotary disk provided with laterally projecting studs, a series of segmental saw blades having end notches engaging said studs, means for clamping the blades in said engaging position, and means for holding a piece of work for the operation of said blades.

8. A metal cutting machine having a rotary disk provided with laterally projecting studs, a series of segmental saw blades having end notches engaging said studs, a corresponding series of plates having end notches also engaging said studs, means for clamping said plates with the blades between them and the disk, and means for holding a piece of work for the operation of said blades.

9. A metal cutting machine having a rotary saw, a rotatable chuck adjacent the operative path of the saw, means for manually operating the chuck in either direction of rotation, and means for manually advancing the chuck toward the saw.

10. A metal cutting machine having a rotary carrier, a series of thin segmental saw blades of uniform thickness fixedly mounted on the carrier in alinement, a work chuck adjacent said carrier, means for manually rotating the chuck, and means for manually advancing the chuck toward the carrier.

In testimony whereof I have affixed my signature.

FREDERIC W. ERICKSON.